No. 750,515. PATENTED JAN. 26, 1904.
F. A. WUNDERLICH.
PARAFFIN BATH FOR MICROSCOPISTS.
APPLICATION FILED FEB. 4, 1903.
NO MODEL.
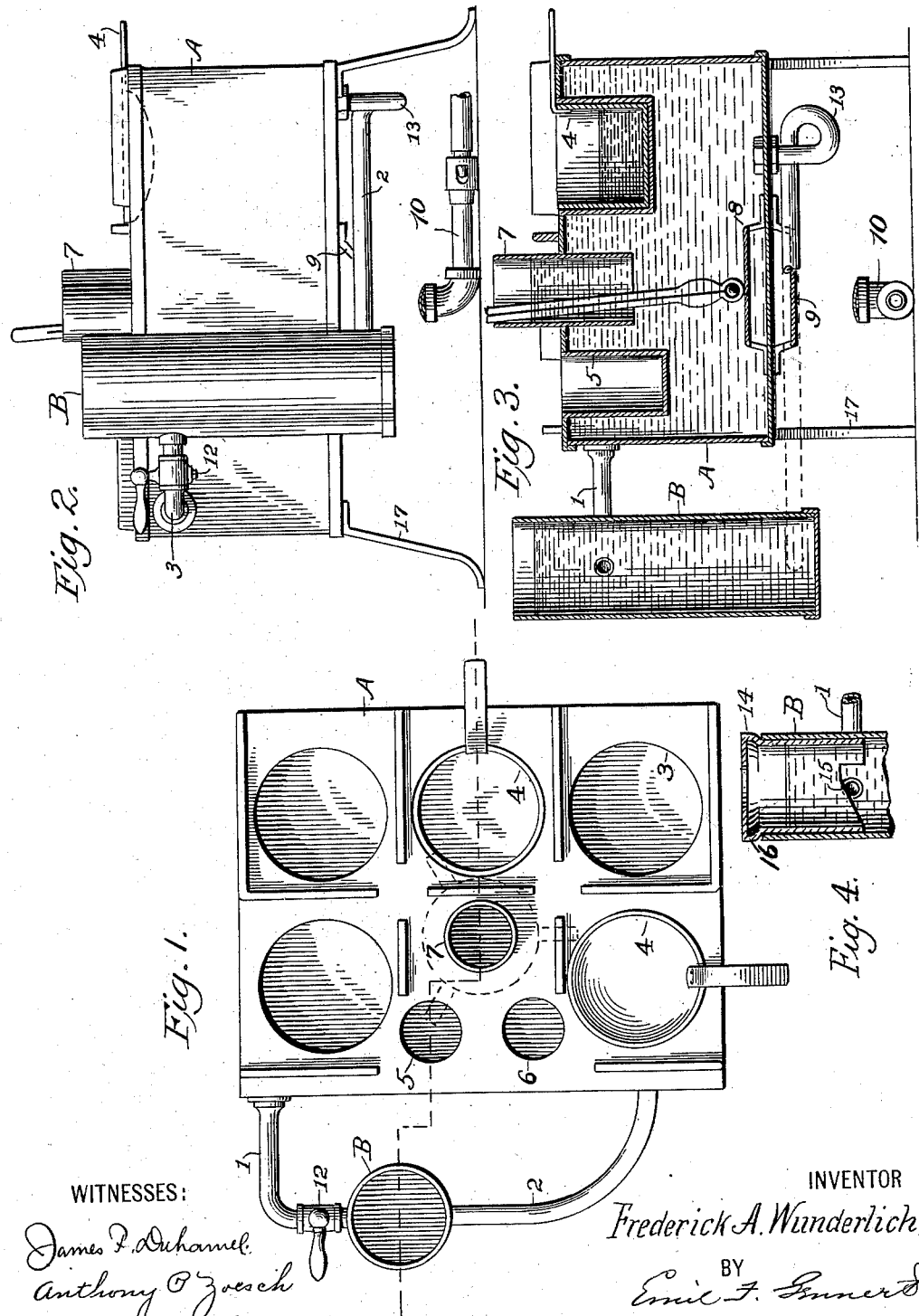
WITNESSES:
James P. Duhamel
Anthony O. Zoesch
INVENTOR
Frederick A. Wunderlich,
BY
Emil F. Gennert
ATTORNEY No. 750,515. Patented January 26, 1904.

UNITED STATES PATENT OFFICE.

FREDERICK A. WUNDERLICH, OF NEW YORK, N. Y.

PARAFFIN-BATH FOR MICROSCOPISTS.

SPECIFICATION forming part of Letters Patent No. 750,515, dated January 26, 1904.

Application filed February 4, 1903. Serial No. 141,848. (No model.)

*To all whom it may concern:*

Be it known that I, FREDERICK A. WUNDERLICH, a citizen of the United States, residing in the borough of Brooklyn, city of New York, county of Kings, and State of New York, have invented a new and useful Improvement in Paraffin Baths for Microscopists, of which the following is a specification.

My invention relates to an improvement in paraffin-baths such as are used by microscopists for preparing objects for section-cutting and subsequent mounting on slides for observation purposes, the objects of my invention being to produce a simple device having means for keeping the water which heats the paraffin in a uniform and constant temperature and by causing said water to circulate in the device only a small quantity of it is exposed to the heating agent at one time.

Reference being had to the accompanying drawings, Figure 1 is a plan view of my improved bath. Fig. 2 is a rear elevation of same. Fig. 3 is a sectional view of Fig. 1 on line X X, and Fig. 4 is a modification of a means for regulating the circulation of the water.

Similar characters of reference refer to similar parts in the several views.

A is a main tank or body of the bath as a whole. B is a cylindrical tank, both containing water to be heated, the two tanks being connected by two tubes 1 2, through which water circulates when heated and in operation. The upper surface of the tank A is provided with a series of depressions or cups 3, flat or round bottom, into which the dishes or cups 4 closely fit, so that the heat will be transmitted through contact.

5 6 are also depressions extending into the water, so that any tools or implements for mounting may be warmed.

7 is a tubular extension, open at both ends to admit of a thermometer and for other purposes.

On the bottom of the tank A, I prefer to place a plate 8, raised above the surface, upon which a thermometer or tools can rest. An outer plate 9, placed immediately below the inner plate 8, affords a baffle or means for preventing the direct flame of the burner or heating agent 10 from striking the bottom of the body A. This flame if in the vicinity of the thermometer causes a false reading of it to occur. 11 are strips on the upper surface of the body A to limit the positioning of pieces of glass to cover the dishes containing paraffin to exclude dust or foreign matter, as is usual in paraffin baths of conventional make. A stop-cock 12 is placed in the tube 1, whereby the flow or circulation of water can be regulated. A loop 13 to form a simple trap prevents the water from "backing up" or returning through tube 2 from the main tank A to the tank B.

A modified regulating device is shown in Fig. 4. A bushing 14, open at the top and fitting snugly in the tank B, is inserted in the upper end. The lower edge is cut away, so that an inclined notch 15 is formed. The notch is cut out, so as to be above the tube 1, and when revolved to an uncut part of the bushing the hole or passage to tube 1 will be closed off. The bushing can be turned or revolved by grasping the bead 16.

17 represents legs upon which the body A rests.

Such being the construction, the operation is as follows: The tank A is filled with water through the tube 7 until it rises up in tank B above the tank A. The heating agent (a Bunsen burner 10 is shown) is placed under plate 9 of tank A. As the water begins to heat and expand it rises in tank B and in the tube 7 and begins to circulate through tubes 1 and 2, the stop-cock or check being open. When the water is sufficiently hot, the burner is placed under the tank B, (shown in Fig. 3,) and the flame is lowered. The checking means are manipulated so that an even flow or circulation is established between the two tanks, and when once adjusted—*i. e*, the heat and the quantity of water circulating through the two vessels—the bath will work for any length of time, it being only necessary to add water to make up for loss by evaporation. The inlet and outlet tubes are placed so that the water in circulating travels from one corner transversely to the other, the depressed cups so diverting the current that the water heats all the parts of the tank A evenly.

The baffle-plate 9 prevents the heat of the burner from directly striking the surface of the bottom of the tank where the thermometer rests, so as to avoid erroneous reading.

Having fully described my invention, what I claim as new, and desire to secure by Letters Patent of the United States, is—

1. A water-heating device of the type set forth, comprising a series of cup-receiving depressions therein, an open cylindrical extension opening into said device, an interiorly-arranged raised plate secured below said extension on the bottom of the water-heating device, an exteriorly-arranged plate secured below the last-named plate, and a secondary tank connected with said water-heating device, substantially as described.

2. In a device of the character described, a main tank, having a number of vessel-receiving depressions therein, a tubular extension open at both ends carried by said tank, raised plates arranged beneath the said extension exteriorly and interiorly with relation to the bottom of said tank, and a secondary tank connected to the main tank to permit of the circulation of the water between the two, substantially as described.

3. In a water-heating device of the character described, the combination with a main tank having vessel-receiving depressions therein, an open cylindrical extension formed in the tank, a pair of raised plates secured to the bottom of the tank forming spaces between the said bottom and plates, and a secondary tank having connection with the main tank for circulation of water therebetween, substantially as described.

In testimony whereof I have signed my name to this specification, in the presence of two subscribing witnesses, this 22d day of January, 1903.

FREDERICK A. WUNDERLICH.

Witnesses:
ANTHONY P. ZOESCH,
ROBERT F. THOMAS.